United States Patent
Yoon et al.

(10) Patent No.: US 10,515,607 B2
(45) Date of Patent: *Dec. 24, 2019

(54) DISPLAY APPARATUS AND METHOD FOR CONTROLLING THE SAME

(71) Applicant: SAMSUNG ELECTRONICS CO., LTD., Suwon-si (KR)

(72) Inventors: Seung-il Yoon, Yongin-si (KR); Ji-hyo Lee, Suwon-si (KR); Hyun-kyu Yun, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/014,157

(22) Filed: Jun. 21, 2018

(65) Prior Publication Data

US 2018/0301112 A1    Oct. 18, 2018

Related U.S. Application Data

(63) Continuation of application No. 15/397,297, filed on Jan. 3, 2017, now Pat. No. 10,032,434.

(30) Foreign Application Priority Data

Jan. 5, 2016    (KR) .................. 10-2016-0001075

(51) Int. Cl.
*H04N 5/44*    (2011.01)
*G09G 5/00*    (2006.01)
(Continued)

(52) U.S. Cl.
CPC ............. *G09G 5/006* (2013.01); *G06F 3/147* (2013.01); *H04N 5/44* (2013.01);
(Continued)

(58) Field of Classification Search
CPC ............... H04N 5/44; H04N 21/43635; H04N 21/44227; H04N 21/4436; G09G 5/006;
(Continued)

(56) References Cited

U.S. PATENT DOCUMENTS 6,587,154 B1 * 7/2003 Anderson .......... H04N 5/44513
                                                                  348/553
8,810,732 B1    8/2014 Bozarth et al.
(Continued)

FOREIGN PATENT DOCUMENTS

JP       08030248 A  *  2/1996
JP    2008-177935 A     7/2008
(Continued)

OTHER PUBLICATIONS

Communication dated Mar. 21, 2017 issued by the International Searching Authority in counterpart International Application No. PCT/KR2017/000007 (PCT/ISA/210/237).
(Continued)

*Primary Examiner* — Michael Lee
(74) *Attorney, Agent, or Firm* — Sughrue Mion, PLLC

(57) ABSTRACT

A display apparatus is provided. The apparatus includes a display configured to display an image corresponding to a first connection interface of a plurality of connection interfaces; and a processor configured to, in response to detecting a change of a power state of an external apparatus connected to the display apparatus through a second connection interface of the plurality of connection interfaces, determine whether content is inputted through the first connection interface, and control the display to display a user interface (UI) indicating that source switch is available or display an image received through the second connection interface, based on a result of the determination.

16 Claims, 8 Drawing Sheets

(51) Int. Cl.
*H04N 21/4363* (2011.01)
*H04N 21/443* (2011.01)
*H04N 21/442* (2011.01)
*G06F 3/147* (2006.01)

(52) U.S. Cl.
CPC ... *H04N 21/43635* (2013.01); *H04N 21/4436* (2013.01); *H04N 21/44227* (2013.01); *G09G 2330/021* (2013.01); *G09G 2370/12* (2013.01)

(58) Field of Classification Search
CPC .......... G09G 2230/021; G09G 2370/12; G06F 3/147
USPC .......................................................... 348/720
See application file for complete search history.

(56) References Cited

U.S. PATENT DOCUMENTS

| | | | | |
|---|---|---|---|---|
| 10,032,434 | B2* | 7/2018 | Yoon | G09G 5/006 |
| 2004/0263694 | A1* | 12/2004 | Kim | H04N 5/44513 |
| | | | | 348/705 |
| 2005/0220440 | A1 | 10/2005 | Liebhold | |
| 2007/0153132 | A1* | 7/2007 | Jong | H04N 5/268 |
| | | | | 348/705 |
| 2007/0220150 | A1 | 9/2007 | Garg | |
| 2007/0298656 | A1 | 12/2007 | He | |
| 2010/0074560 | A1* | 3/2010 | Wagner | H04N 1/32128 |
| | | | | 382/309 |
| 2013/0083243 | A1* | 4/2013 | Freund | H04N 5/44591 |
| | | | | 348/565 |

FOREIGN PATENT DOCUMENTS

| | | | |
|---|---|---|---|
| JP | 2011086992 | A | 4/2011 |
| KR | 100297526 | B1 | 3/2002 |
| KR | 100487303 | B1 | 5/2005 |
| KR | 1020060131160 | A | 12/2006 |
| KR | 1020070058925 | A | 6/2007 |
| KR | 10-20090032229 | A | 4/2009 |
| KR | 10-2009-0075216 | A | 7/2009 |
| KR | 10-0979083 | B1 | 8/2010 |

OTHER PUBLICATIONS

Communication dated Apr. 7, 2017 issued by the European Patent Office in counterpart European Patent Application No. 16207521.2.
"Samsung LED TV User Manual Series 4" (http://displaysolutions.samsung.com/fileDownload/43191?dir=hospitality-display&file=Manual) Feb. 17, 2012; 2 pages total.
Communication dated Jul. 13, 2018, from the European Patent Office in counterpart European Application No. 16207521.2.
Communication dated Feb. 25, 2019 issued by the European Patent Office in European counterpart Application No. 16207521.2.

* cited by examiner

DISPLAY APPARATUS AND METHOD FOR CONTROLLING THE SAME

CROSS-REFERENCE TO RELATED APPLICATIONS

This application is a continuation of U.S. patent application Ser. No. 15/397,297, filed Jan. 3, 2017 in the U.S. Patent and Trademark Office, which claims priority from Korean Patent Application No. 10-2016-0001075, filed on Jan. 5, 2016 in the Korean Intellectual Property Office, the disclosures of which are incorporated herein by reference in their entireties.

BACKGROUND

1. Field

Exemplary embodiments relate to a display apparatus that receives content from a plurality of sources and a method for controlling the same.

2. Description of the Related Art

With the development of electronic technologies, various types of display apparatuses have been developed and have come into wide use. A television (TV) is a notable example. The TVs which are recently on the market are capable of receiving and displaying content inputted from various external sources, such as, a Digital Versatile Disc (DVD) player, a Blu-ray disk player, or the like, as well as broadcast content transmitted from a broadcasting station.

A user is able to select a particular source from among the various sources to watch content received from the selected source.

However, when the user wishes to switch the source, the user needs to carry out several steps of manipulation, for example, selecting a menu for choosing a source and then choosing a certain desired source through the menu.

Specially, when the TV is set to be manipulated by a remote controller, the user is inconvenienced by repeatedly pressing a directional button until reaching the desired source.

Accordingly, there is a necessity for a method for switching a source more conveniently.

SUMMARY

Exemplary embodiments address at least the above problems and/or disadvantages and other disadvantages not described above. Also, the exemplary embodiments are not required to overcome the disadvantages described above, and may not overcome any of the problems described above.

According to an aspect of an exemplary embodiment, there is provided a display apparatus including: a display configured to display an image corresponding to a first connection interface of a plurality of connection interfaces; and a processor configured to, in response to detecting a change of a power state of an external apparatus connected to the display apparatus through a second connection interface of the plurality of connection interfaces, determine whether content is inputted through the first connection interface, and control the display to display a user interface (UI) indicating that source switch is available or display an image received through the second connection interface, based on a result of the determination.

According to an aspect of another exemplary embodiment, there is provided a method for displaying an image corresponding to a first connection interface of a plurality of connection interfaces; determining, in response to detecting a change of a power state of an external apparatus connected to the display apparatus through a second connection interface among the plurality of connection interfaces, whether content is inputted through the first connection interface; and displaying a user interface (UI) indicating that source switch is available or displaying an image received through the second connection interface, based on a result of the determining.

According to an aspect of another exemplary embodiment, there is provided a computer-readable recording medium storing a program that is executable by a computer to perform the method for controlling the display apparatus.

According to an aspect of another exemplary embodiment, there is provided a method for controlling a display apparatus including: receiving data from a first source through a first connection interface; detecting a change of a power mode of a second source connected to the display apparatus through a second connection interface; and generating a user interface that provides a user with an option to change a current source of the display apparatus from the first source to the second source in response to the detection of the change of the power mode.

The detecting the change of the power mode of the second source may include detecting a change of at least one of a current value, a voltage value, and a power value of the second connection interface.

The user interface may provide the user with an option to change a current connection interface from the first connection interface to the second connection interface in response to the detection of the change of the power mode.

BRIEF DESCRIPTION OF DRAWINGS

The above and/or other aspects will be more apparent by describing certain exemplary embodiments, with reference to the accompanying drawings, in which:

FIG. 7 is a flowchart provided to describe an example of a method for controlling a display apparatus according to detection of a an external apparatus being powered on.

DETAILED DESCRIPTION

Figure 1:
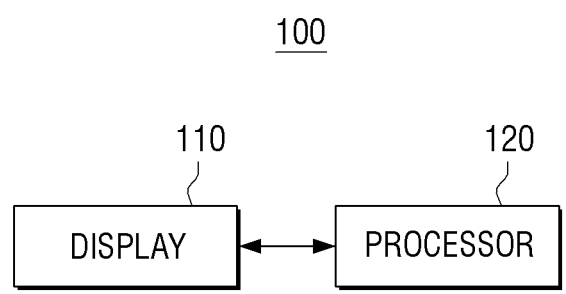
FIG. 1 is a block diagram illustrating a configuration of a display apparatus according to an exemplary embodiment.

Exemplary embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions are not described in detail since they would obscure the description with unnecessary detail.

In the following description and claims, a term including an ordinal, such as, 'first,' 'second,' or the like, may be used to distinguish elements. The ordinal is used to distinguish the same or similar elements and does not limit the meaning of the term. For instance, ordinals do not affect an order of use or an order of arrangement of elements expressed with the ordinals. Respective ordinals may be replaced with each other, if necessary.

A term in a singular form includes a plural form unless it is intentionally written that way. In the following description, a term, such as, 'include,' 'consist of,' or the like, refers to the disclosed features, numbers, steps, operations, elements, parts, or combinations thereof and is not intended to exclude any possibilities of existence or addition of one or more other features, numbers, steps, operations, elements, parts, or combinations thereof.

In the following description, a term 'module,' 'unit,' or 'part' refers to an element that performs at least one function or operation. The 'module' or 'unit' may be realized as hardware, software, or combinations thereof. A plurality of 'modules,' 'units,' or 'parts' may be integrated into at least one module or chip and realized as at least one processor, except for a case where respective 'modules' or 'units' need to be realized as discrete specific hardware.

When it is described that one part is connected to another part, the connection includes a direct connection of the parts and an indirection connection through other medium. Further, the expression that a part 'includes' a certain element signifies that the part may further include other elements on top of the certain element, not excluding the other elements than the certain element, unless otherwise described.

FIG. 1 is a block diagram illustrating a configuration of a display apparatus 100 according to an exemplary embodiment.

The display apparatus 100 may be a TV, but this is only an example. The display apparatus 100 may be realized as diverse apparatuses, such as, a smart phone, a tablet Personal Computer (PC), a desktop PC, a monitor, a projector, and so on.

Referring to FIG. 1, the display apparatus 100 includes a display 110 and a processor 120.

The display 110 displays various screens according to control of the processor 120.

The display 110 may be realized as a Liquid Crystal Display (LCD), for example, or realized as a Cathode-Ray Tube (CRT), a Plasma Display Panel (PDP), Organic Light-Emitting Diodes (OLED), transparent Organic Light-Emitting Diodes (TOLED), or the like. Further, the display 110 may be realized as a touch screen capable of detecting a user's touch manipulation.

The display 110 may display an image corresponding to a first source of a plurality of sources. In particular, the source may provide an image signal and/or a sound signal to the display apparatus 100. The source may be an external apparatus connected to an input/output (I/O) port of the display apparatus 100 to provide content or may be an internal memory of the display apparatus 100. In this case, the content refers to images, voices, music, data, or the like.

The processor 120 controls overall operations of the display apparatus 100.

As an example, the processor 120 may include a Central Processing Unit (CPU), a Random Access Memory (RAM), a Read-Only Memory (ROM), and a system bus. The ROM stores a command set for system booting. The CPU copies an Operating System (O/S) in a storage of the display apparatus 100 to the RAM according to the commands retrieved from the ROM and boots up the system by executing the 0/S. Upon completion of the boot-up operation, the CPU copies various applications in the storage to the RAM and executes the applications to perform various operations. The processor 120 includes a single CPU in the above example, but the CPU may be realized as a plurality of CPUs (a Digital Signal Processor (DSP), a System-on-Chip (SoC), or the like).

When the processor 120 detects a change of a power state of a second source among the plurality of sources, the processor 120 may determine whether content is inputted from the first source preselected from among the plurality of sources, and may control the display 110 to display an image corresponding to the second source and/or to display a user interface (UI) indicating that the user is able to change the source of the display apparatus 100 from the first source to the second source. In this case, the 'first source' and the 'second source' are terms for distinguishing the plurality of different sources and are not limited to any particular sources.

The change of the power state of the second source (e.g., an external device) may signify that the power state of the second source is changed from a power-saving state or a power-off state to a power-on state. The power-off state may refer to a state in which a plug of a power cable of the second source is not connected to an electrical outlet, or power supply to the second source is shut down even though the power cable itself is connected to the electric outlet of the second source. The power-saving state may refer to a state in which the plug of the power cable of the second source is connected to the electrical outlet but performance of the second source is restricted in order to save power. In the power-saving state, the second source may limit the maximum performance of a central processing unit (CPU), reduce a screen frame rate, lower brightness of a display, and turn off optional features. Both the power-saving state and the power-off state refer to a state in which the content input from the second source to the display apparatus 100 is interrupted, that is, a state in which the content input is unavailable. The power-on state of the second source refers to a state in which the content input to the display apparatus 100 is available.

As another example, the change of the power state of the second source may signify that a powered-on external apparatus is connected to the display apparatus 100. That is, the change of the power state of the second source may signify that a cable of the powered-on second source is connected to the I/O port of the display apparatus 100.

When the processor 120 detects the change of the power state of the second source, the processor 120 determines whether content is inputted from the preselected first source. The preselected first source refers to a source which is currently selected.

The processor 120 may determine whether the content is inputted from the preselected first source based on whether the display 110 displays the image of the preselected first source or a speaker connected to the display apparatus 110 outputs sound of the preselected first source.

Further, processor 120 may determine whether the content is inputted from the preselected first source by analyzing the image corresponding to the preselected first source. The analysis of an image may be performed by comparing a pre-stored image to a currently displayed image, analyzing objects or colors of the currently displayed image, or the like.

As an example, the processor 120 may determine whether the content is inputted from the preselected first source by determining whether the image corresponding to the preselected first source is a scrambled image. To be specific, in response to determining that the image corresponding to the preselected first source is the scrambled image, the processor 120 may determine that the content is not inputted from the preselected first source.

The scrambled image may be an image displayed in response to no content being inputted from a selected source, and this is only an example. That is, any kind of image set to be displayed in response to no content input from the selected source may be regarded as the scrambled image.

The processor 120 may determine whether the content is inputted from the preselected first source based on the power state of the preselected first source. For example, when the power state of the preselected first source is the power-saving state or the power-off state, the processor 120 may determine that the content is not inputted from the first source. When the power state of the second source is the power-on state, the processor 120 may determine that the content is inputted from the second source.

In response to determining that the content is not inputted from the preselected first source, the processor 120 may control the display 110 to display an image receiving from the second source immediately. That is, the processor 120 may determine that the user wants to watch content received from the second source when the second source is powered on. Accordingly, the processor 120 performs an operation corresponding to the user's intention by automatically switching the source of the display apparatus 100 from the first source to the second source. This exemplary embodiment will be described below in further detail with reference to FIG. 2.

In response to determining that the content is inputted from the preselected first source, the processor 120 may control the display 110 to display a UI indicating that source switch is available. In particular, the UI may include a message informing a user that the source switch from the first source to the second source is available, a button to switch to the second source, and a button to exit the UI. Since the user may want to continuously watch the current content although the second source is powered on, the processor 120 may control the source to be switched manually by the user's selection without automatically switching the source. This exemplary embodiment will be described below in further detail with reference to FIG. 3.

Figure 2:
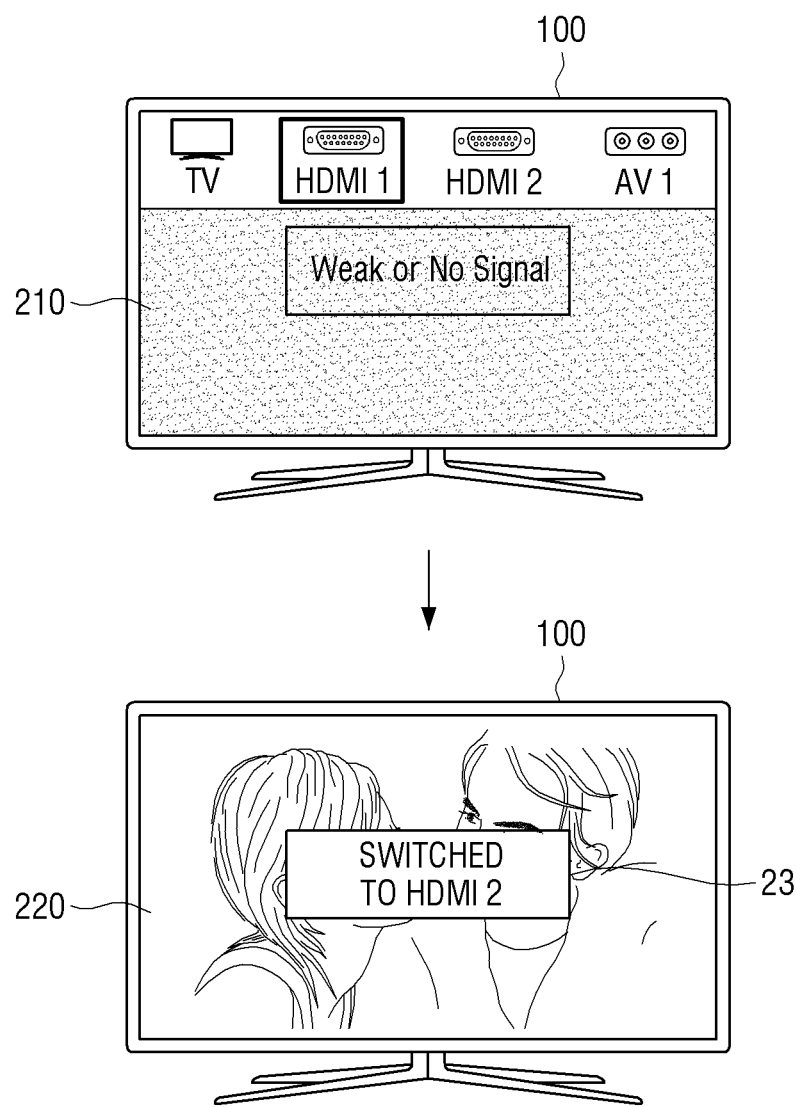
FIG. 2 is a diagram provided to describe an example of source switch of a display apparatus according to detection of a change of a power state of an external apparatus.
Figure 3:
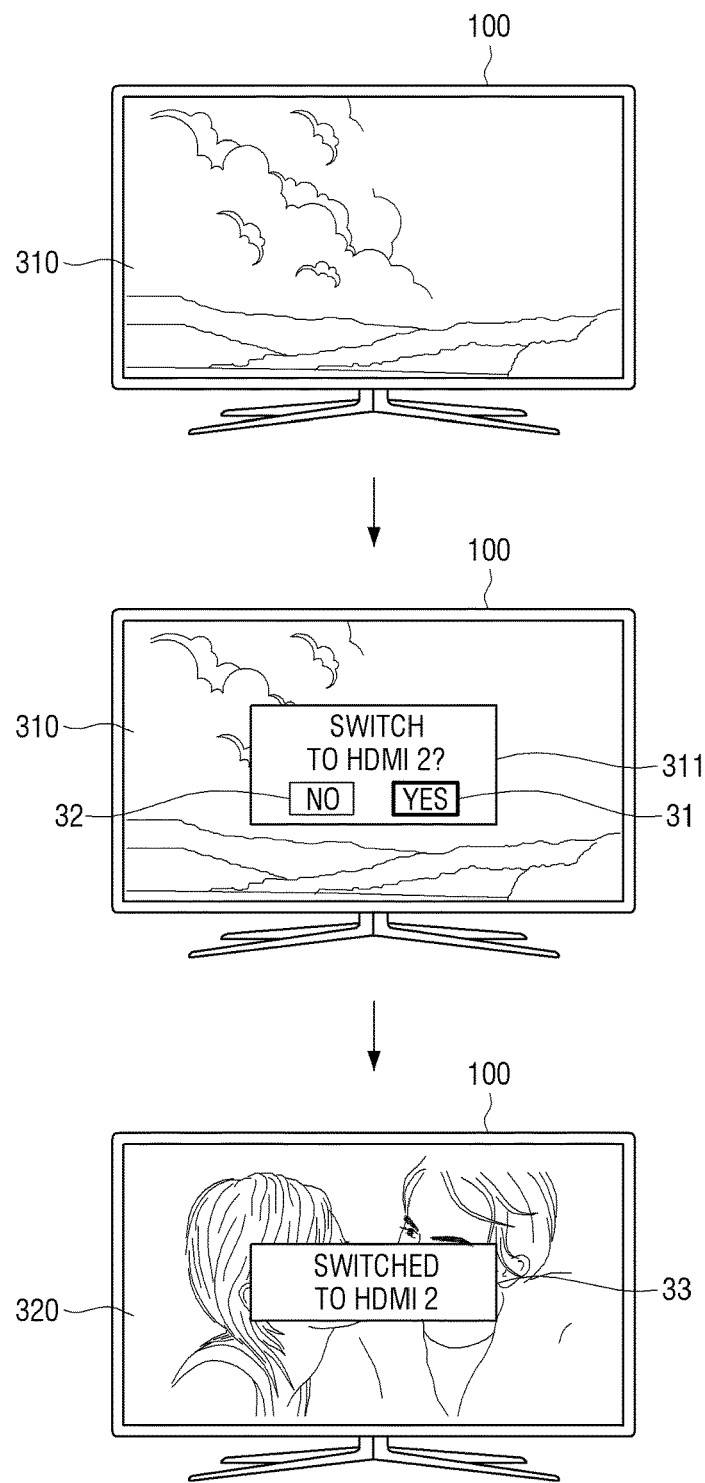
FIG. 3 is a diagram provided to describe another example of source switch of a display apparatus according to detection of a change of a power state of an external apparatus.

FIGS. 2 and 3 are diagrams provided to describe examples of source switch according to various exemplary embodiments.

FIG. 2 is a diagram provided to describe an example of automatic source switch according to an exemplary embodiment.

Referring to FIG. 2, in response to detecting a change of a power state of a second source connected to the display apparatus 100 via High Definition Multimedia Interface (HDMI) 2 while a scrambled image 210 is displayed in the display apparatus 100, the processor 120 determines that content is not inputted from a first source through HDMI 1. For example, when the processor 210 detects through the HDMI 2 that the second source is powered on and determines that the scrambled image 210 is displayed, the processor 120 determines that content is not inputted from the first source through HDMI 1. Further, the processor 120 may determine that the content is not inputted from the first source based on the power state of the first source or the power state of the HDMI 1.

In this case, the processor 120 may automatically switch the connection interface of the display apparatus 100 from the HDMI 1 to the HDMI 2 and may control the display 110 to display an image 220 that is received from the second source via the HDMI 2. Further, the processor 120 may control the display 110 to display a message 23 informing that the source switch is complete, along with the image 220.

FIG. 3 is a diagram provided to describe an example of manual source switch according to an exemplary embodiment.

Referring to FIG. 3, in response to detecting the change of the power state of the second source connected to the display apparatus 100 via the HDMI 2 while an image 310 of the currently selected first source is displayed in the display apparatus 100, the processor 120 may determine that the content is inputted from the currently selected first source by analyzing the currently displayed image. For example, when the processor 210 detects through the HDMI 2 that the second source is powered on and determines the image 310 is displayed, the processor 210 determines that content is inputted from the first source through the HDMI 1. Further, the processor 120 may determine that the content is inputted from the first source based on the power state of the currently selected first source.

In this case, the processor 120 may display a UI 311 indicating that the source switch is available on the currently displayed image 310 rather than automatically switching to the HDMI 2. The UI 311 may include a name of an available connection interface through which data is to be received from a new source, and a message inquiring as to whether to switch to the source. The available connection interface may include the HDMI 2, an audio video (AV) connection interface, a D-subminiature (D-Sub) connection interface, and a digital visual interface (DVI). Here, the connection interface may also be referred to as a connection type or an input mode. The UI 311 may further include a button 31 to accept the source switch and a button 32 to close or exit the UI 311.

In response to the button 31 to accept the source switch being selected in the UI 311, the processor 120 may control the display 110 to display an image 320 inputted through the HDMI 2. Further, the processor 120 may control the display 110 to display a message 33 informing that the source switch is complete along with the image 320. In response to the button 32 being selected, the processor 120 may close the UI 311 and control the display 110 to continuously display the image from the first source 21. The manipulation of the buttons 31 and 32 in the UI 311 may be performed through a remote controller which may communicate with the display apparatus 100 or through a manipulation unit provided in the display apparatus 100.

According to another exemplary embodiment, when the content input from the first source is interrupted, the processor 120 may switch the current connection interface (e.g., HDMI 1) to a second connection interface (e.g., HDMI 2) to receive data from a second source which is connected to the display apparatus 100 via the second connection interface (e.g., HDMI 2). For example, the first source may be a video game device and the second source may be a DVD player.

The interruption of the content input may include a change of the power state of the first source from the power-saving state to the power-saving state or to the power-off state, disconnection of a cable between the first source and the display apparatus 100, or the like.

In response to detecting the interruption of the content input from the currently selected source, the processor 120 may determine whether content is inputted from another source. For example, the processor 120 may determine an external apparatus providing content by analyzing an image signal and/or sound signal transmitted from respective external apparatuses connected to the I/O ports of the display apparatus 100 and determine that the external apparatus providing the content is a source capable of providing content.

In this case, in response to one source capable of providing content being present, the processor 120 may control the display 110 to display an image of the source.

In response to a plurality of sources capable of providing content being present, the processor 120 may select one of the plurality of sources according to a predetermined method and control the display 110 to display an image of the selected source. The predetermined method may include various methods, such as, selecting a source at random, selecting a source selected the most recently, or the like.

As described above, the processor 120 may display the image of the source capable of providing content. Alternatively, the processor 120 may display a UI inquiring as to whether to switch to the source. The UI may be similar to the UI of FIG. 2. In this case, in response to a plurality of sources capable of providing content being present, a UI including a list of the plurality of sources may be displayed such that the user selects a source from the list. Also, when a plurality of connection interfaces capable of providing content are present, a UI including a list of the plurality of connection interfaces may be displayed such that the user selects a connection interface from the list.

The above exemplary embodiment will be described below in greater detail with reference to FIG. 4.

Figure 4:
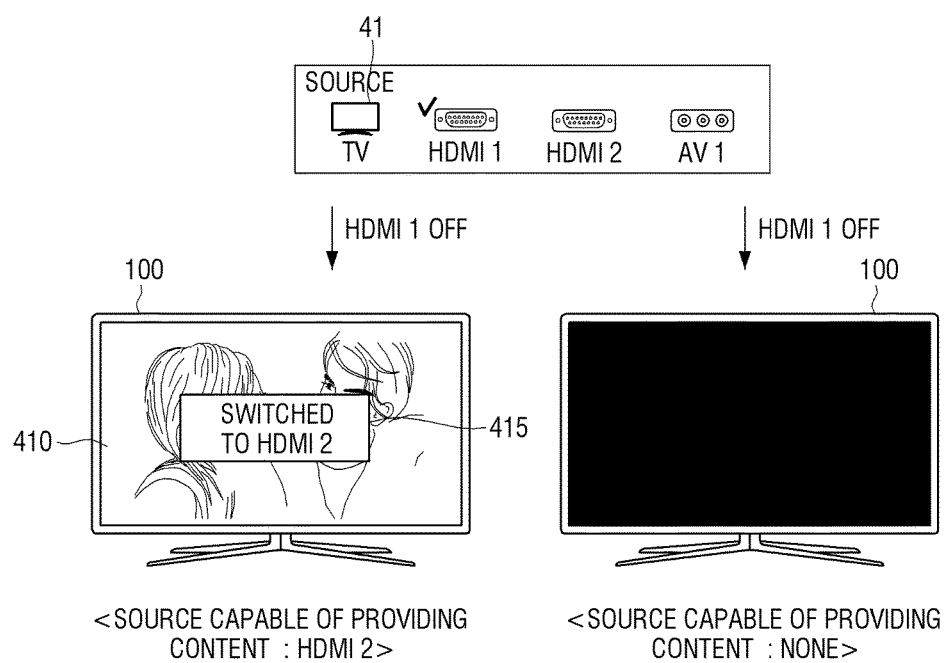
FIG. 4 is a diagram provided to describe an example of source switch of a display apparatus according to detection of interruption to content input from an external apparatus corresponding to a currently selected source.

FIG. 4 is a diagram provided to describe an example of source switch of the display apparatus 100 according to an exemplary embodiment.

Referring to FIG. 4, the display apparatus 100 is capable of being connected to a plurality of sources through a plurality of connection interfaces. The plurality of sources include a TV source 41, and also includes a first source, a second source, and a third source which are respectively connected to the display apparatus 100 via an HDMI 1, an HDMI 2, and an Audio/Video (AV) 1. The currently selected source is connected to the display apparatus 100 via the HDMI 1, and the currently selected connection interface is the HDMI 1.

In this case, in response to the power state of an external apparatus corresponding to the HDMI 1 being changed to the power-off state or to the power-saving state, a processor 120 may search for another source capable of providing content from among the other sources.

In this case, in response to the source capable of providing content being connected to the display apparatus 100 through the HDMI 2, the processor 120 may control the display 110 to display an image 410 received through the HDMI 2. Further, the processor 120 may control the display 110 to display a message 415 informing that the source switch is complete, along with the image 410. In response to no source capable of providing content being present, the processor 120 may change an operating mode of the display apparatus 100 to a power-saving mode.

According to the above exemplary embodiment, in response to a power state of a certain external apparatus being changed to the power-off state or to the power-saving state, the display apparatus 100 may change the operating mode to the power-off mode or to a power-saving mode automatically or switch a source to another source capable of providing content automatically according to a state of content provision of the sources connected to the display apparatus 100 without user's manipulation. Accordingly, user convenience may be enhanced.

Figure 5:
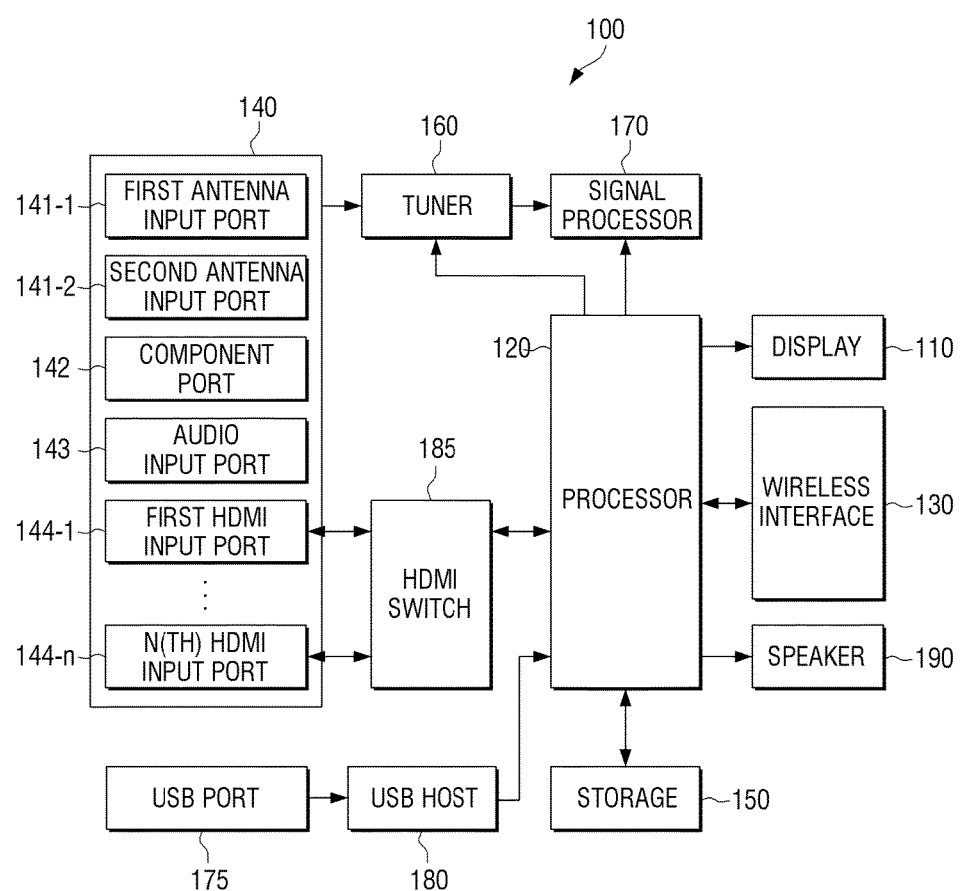
FIG. 5 is a block diagram illustrating a detailed configuration of a display apparatus according to an exemplary embodiment.

FIG. 5 is a block diagram illustrating a detailed configuration of the display apparatus 100. Referring to FIG. 5, the display apparatus 100 may include the display 110 and the processor 120 and further include a wireless interface 130, an I/O port 140, a storage 150, a tuner 160, a signal processor 170, a Universal Serial Bus (USB) port 175, a USB host 180, an HDMI switch 185, and a speaker 190.

A repeated description for the above-described operations of the display 110 and the processor 120 will be omitted.

The wireless interface 130 performs wireless communication with diverse external apparatuses. To be specific, the wireless interface 130 performs the wireless communication in various communication methods, such as, Wireless-Fidelity (Wi-Fi), Wi-Fi Direct, Wireless Gigabit Alliance (Wi-Gig), Zigbee, Bluetooth, Infrared Rays (IR), Near Field Communication (NFC), or the like.

Specially, the wireless interface 130 may receive a control command for controlling the display apparatus 100 from a remote control device. BAs illustrated in FIG. 3, in response to the UI 311 indicating that the source switch is available being displayed and a control signal corresponding to the button 31 to accept the source switch being received from the remote control device through the wireless interface 130, the processor 120 may change the source.

The I/O port 140 refers to a port connectable to various types of external apparatuses.

The I/O port 140 may include first and second antenna input ports 141-1, 141-2, a component port 142, an audio input port 143, and first to n-th HDMI input ports 144-1 to 144-n. The configuration of FIG. 5 is only an example of the I/O port 140, and types, positions, and the number of the ports may vary. For example, the I/O port 140 may further include a PC input port, an EX-LINK port, a Local Area Network (LAN) port.

The processor 120 may detect the change of the power state of an external apparatus.

For example, the processor 120 may detect the change of the power state of the external apparatus connected through the first to n-th HDMI input ports 144-1 to 144-n through a HDMI-Consumer Electronic Control (CEC) function. Accordingly, in response to the power state of the external apparatus being changed from the power-saving state or the power-off state to the power-on state or changed from the power-on state to the power-saving state or to the power-off state, the processor 120 may detect the change and switch the source, control the display 110 to display a particular UI, or change the operational mode of the display apparatus 100 to the power-saving mode as described above.

The tuner 160 tunes broadcasting channels received through the first antenna input port 141-1 or through the second antenna input port 141-2. The first antenna input port 141-1 may be realized as a dedicated channel for a digital broadcast, and the second antenna input port 141-2 may be realized as a common channel for an analog broadcast, a cable broadcast, and the digital broadcast.

In response to the analog broadcast being received through the second antenna input port 141-2, the processor 120 may control the signal processor 170 to convert content of the analog broadcast to digital data.

In response to receiving the analog broadcast, the signal processor 170 samples a signal of the analog broadcast to a random frequency and convert the frequency to the digital data through Analogue-Digital Conversion (ADC).

In the exemplary embodiment of FIG. 5, the display apparatus 100 includes one signal processor 170, and the signal processor 170 performs entire operations of processing an analog signal, but this is only an example for convenience in explanation. The signal processor 170 may be realized as a plurality of signal processors, for example, a video processor, an audio processor, or the like, needless to say.

Further, in the exemplary embodiment of FIG. 5, the display apparatus 100 includes one audio input port 143, but the audio input port may be realized as a plurality of input ports, for example, a digital audio input port, an analog audio input port, or the like.

The speaker 190 may output an audio signal received through the audio input port 143 or output an audio signal received through other I/O port or USB port.

The processor 120 may control the display 110 to display an image received from an external apparatus connected through at least one input port included in the I/O port 140.

The USB port 175 is a component to which various USB sources are connected. For example, a USB memory stick or an external terminal may be connected to the USB port 175.

The USB host 180 is a component for operating with an external source connected to the USB port 175. For example, in response to a USB memory stick being connected to the USB port 175, the processor 120 may read a file stored in the USB memory stick and display the file through the display 110.

The HDMI switch 185 is a component for selecting one of the first to n-th HDMI input ports 144-1 to 144-*n* according to control of the processor 120. In response to one of the HDMI input ports being selected by the user through a remote control device or a button on a main body of the display apparatus 100, the processor 120 transmits a select signal to the HDMI switch 185. The HDMI switch 185 selects an HDMI input port corresponding to the select signal and receives the content through the selected HDMI input port.

In this case, as described above in the exemplary embodiment of FIG. 4, in response to the interruption of the content input from the currently selected source, the processor 120 may sequentially determine whether the image and/or sound is being reproduced in the external apparatuses corresponding to the HDMI input ports, select an HDMI port where reproduction is detected, and receive the content through the selected HDMI port.

The storage 150 stores various programs or data necessary for operations of the display apparatus. The storage 150 may include at least one of diverse kinds of memories, such as, a RAM, a ROM, a Hard Disk Drive (HDD), a flash memory, a buffer, or the like. The storage 150 may store the content received through the I/O port 140.

As described above, the display apparatus 100 may perform various operations depending upon the change of the power state of the external apparatus.

Figure 6:
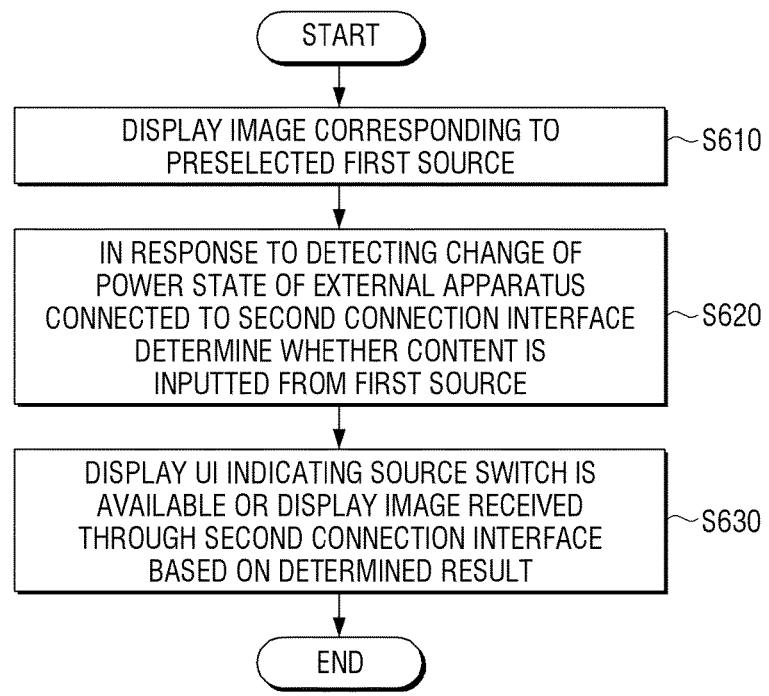
FIG. 6 is a flowchart provided to describe a method for controlling a display apparatus according to an exemplary embodiment.

FIG. 6 is a flowchart provided to describe a method for controlling a display apparatus according to an exemplary embodiment.

Referring to FIG. 6, the display apparatus 100 displays an image received from a first source preselected from among a plurality of sources (operation S610). In response to no image being inputted from the preselected first source, the display apparatus 100 may display a scrambled image. That is, in this case, the image corresponding to the preselected first source may be the scrambled image. In response to an image being inputted from the preselected first source, the display apparatus 100 displays the image.

In response to detecting a change of a power state of a second source among the plurality of sources while the image corresponding to the first source is displayed, the display apparatus 100 determines whether content is inputted from the first source (operation S620). Here, the first source may be connected to the display apparatus 100 through a first connection interface (e.g., HDMI 1), and the second source may be connected to the display apparatus through a second connection interface (e.g., HDMI 2 or AV). For example, when the display apparatus 100 detects a change of a voltage value, a current value, and/or a power value of the second connection interface, the display apparatus 100 may determine that the power state of the second source has changed. The display apparatus 100 may determine whether content is inputted from the first source in various methods. For example, the display apparatus 100 may determine whether content is inputted from the first source by analyzing the image currently being displayed in the display apparatus 100 or determining the power state of the external apparatus corresponding to the first source.

According to the determined result, the display apparatus 100 displays an UI indicating that source switch is available or displays an image corresponding to the second source (operation S630). To be specific, in response to determining that the content is inputted from the first source, the display apparatus 100 display an UI inquiring as to whether to switch to the second source instead of immediately displaying the image corresponding to the second source. In response to determining that the content is not inputted from the first source, the display apparatus 100 switches to the second source automatically.

Figure 7:
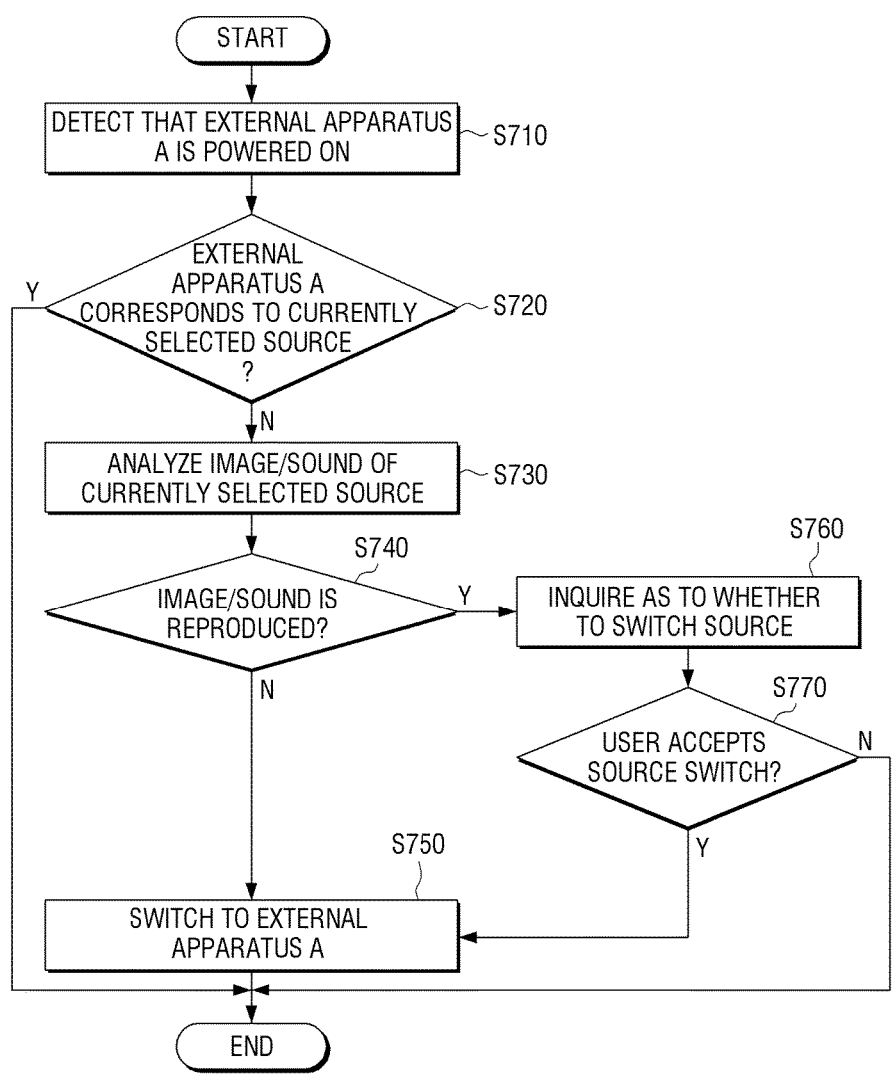

FIG. 7 is a flowchart provided to describe an example of a method for controlling a display apparatus in response to a power state of an external apparatus being changed from a power-saving state to a power-on state.

Referring to FIG. 7, in response to detecting that an external apparatus A is powered on (operation S710), the display apparatus 100 determines whether the external apparatus A is connected to the display apparatus 100 through a currently selected connection interface as a currently selected source (operation S720).

In response to determining that the external apparatus A is connected to the display apparatus 100 not through the currently selected connection interface, the display apparatus 100 analyzes an image corresponding to the currently selected connection interface (operation S730). The display apparatus 100 determines whether an image and/or sound is reproduced (operation S740) by analyzing the image corresponding to the currently selected connection interface (operation S730). In response to determining that the image and/or sound is not reproduced, the display apparatus 100 switches the connection interface to another connection interface compatible with the external apparatus Ay (operation S750).

In response to determining that the image and/or sound is reproduced through the currently selected connection interface, the display apparatus 100 may maintain the connection between the display apparatus 100 and the external apparatus (A) through the currently connection interface and inquires as to whether to switch the currently connection interface to another connection interface (operation S760). For example, the display apparatus 100 may output a voice inquiring as to whether to switch the connection interface through a speaker of the display apparatus 100, display a UI inquiring as to whether to switch the connection interface, or transmit a control signal to a remote control device so as to display the UI in the remote control device.

Subsequently, the display apparatus 100 determines whether a user accepts the switch (operation S770). In response to determining that the user accepted the switch (for example, select an 'OK' button in the displayed UI), the display apparatus 100 switches the connection interface to another connection interface so that the display apparatus 100 receives data from the external apparatus through the other connection interface (operation S750). In response to determining that the user did not accept the switch (for example, select a 'CANCEL' button in the displayed UI), the display apparatus 100 continuously displays the image corresponding to the currently selected connection interface.

According to above exemplary embodiment, in response to the external apparatus being powered on, the display apparatus 100 switches to the powered-on external apparatus automatically based on the currently displayed image or enables the user to switch the source manually. Accordingly, a proper method for switching a source may be used according to circumstances.

Figure 8:
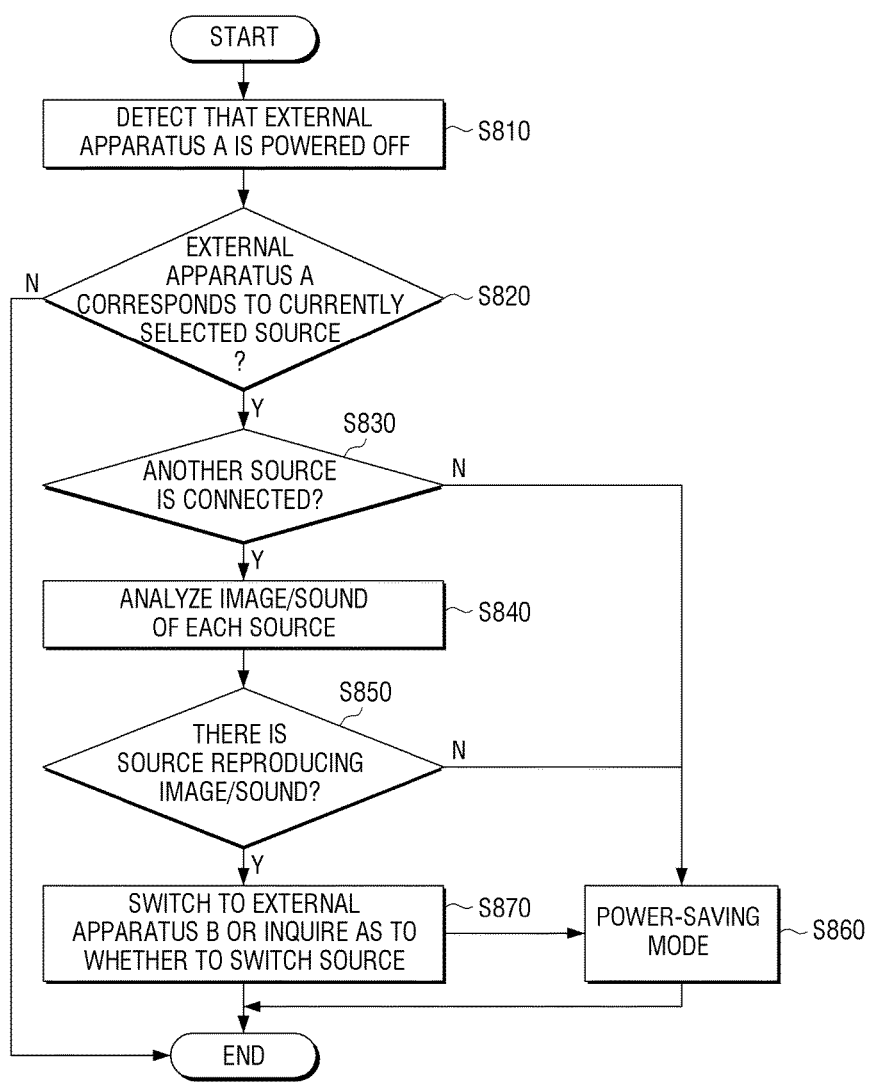
FIG. 8 is a flowchart provided to describe an example of a method for controlling a display apparatus according to detection of a change of an operating mode of an external apparatus to a power-off mode or to a power-saving mode.

FIG. 8 is a flowchart provided to describe an example of a method for controlling a display apparatus in response to a power state of an external apparatus being changed from a power-on state to a power-saving state or to a power-off state.

Referring to FIG. 8, in response to determining that a power state of an external apparatus A is a power-off state or a power-saving state (operation S810), the display apparatus 100 determines whether the external apparatus A is connected to the display apparatus 100 through a first connection interface as a currently selected source (operation S820). The first connection interface is a connection interface selected by a user of the display apparatus 100.

In response to determining that the external apparatus A is connected to the display apparatus 100 through the first connection interface, the display apparatus 100 determines whether there is another external apparatus B that is connected to the display apparatus 100 through a second connection interface (operation S830).

In response to determining that external apparatus B is connected to the display apparatus 100 through the second connection interface, the display apparatus 100 analyzes an image and/or sound of each of the connected external apparatuses A and B (operation S840). The display apparatus 100 determines whether there is a source that reproduces the image and/or sound based on the analysis (operation S850). In response to determining that there is no source reproducing the image and/or sound, the display apparatus 100 changes the operational mode of the display apparatus 100 to the power-saving mode (operation S860).

In response to determining that the source reproducing the image and/or sound corresponds to the external apparatus B, the display apparatus 100 switches the first connection interface to the second connection interface so that the display apparatus 100 receives the image and/or sound from the external apparatus B through the second connection interface or inquires as to whether to switch the connection interface and the source (operation S870). For example, the display apparatus 100 may output a sound inquiring as to whether to switch the source through the speaker of the display apparatus 100, display a UI inquiring as to whether to switch the source in the display apparatus 100, or transmit a control signal to a remote control device of the display apparatus 100 so as to display the UI in the remote control device. In response to determining that the user accepted the source switch, the display apparatus 100 switches to the external apparatus B immediately.

According to above exemplary embodiment, in response to the power state of the external apparatus being changed to the power-off state or to the power-saving state, the display apparatus 100 may switch to an external apparatus capable of reproducing content immediately or change the operational mode of the display apparatus 100 to the power-saving mode, without user's additional manipulation, based on whether the content is reproduced in the external apparatus connected to the display apparatus 100.

While not restricted thereto, an exemplary embodiment can be embodied as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, an exemplary embodiment may be written as a computer program transmitted over a computer-readable transmission medium, such as a carrier wave, and received and implemented in general-use or special-purpose digital computers that execute the programs. Moreover, it is understood that in exemplary embodiments, one or more units of the above-described apparatuses and devices can include circuitry, a processor, a microprocessor, etc., and may execute a computer program stored in a computer-readable medium.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A display apparatus comprising:
   a display; and
   a processor configured to:
      control the display to display an image corresponding to a first source connected to the display apparatus through a first connection interface of a plurality of connection interfaces,
      identify a change of a power state of a second source connected to the display apparatus through a second connection interface of the plurality of connection interfaces,
      based on the power state of the second source being changed from a power-saving state or a power-off state to a power-on state, identify whether first content and second content are inputted through the first connection interface and the second connection interface, respectively,
      based on identifying that the first content is inputted from the first source and the second content is not inputted from the second source, control the display to display the image corresponding to the first source, based on identifying that the first content is not inputted from the first source and the second content is inputted from the second source, control the display to display an image corresponding to the second source, based on identifying that the first content is inputted from the first source and the second content is inputted from the second source, display a user interface (UI) inquiring a user whether to change a source of the display apparatus.

2. The display apparatus as claimed in claim 1, wherein the processor is further configured to identify whether the image corresponding to the first connection interface is a scrambled image.

3. The display apparatus as claimed in claim 1, wherein based on the power state of the second source being changed from the power-saving state to the power-on state, the processor identifies whether the first content is inputted through the first connection interface.

4. The display apparatus as claimed in claim 1, wherein based on the second source being powered on, the processor identifies whether the first content is inputted through the first connection interface.

5. The display apparatus as claimed in claim 1, wherein the processor is further configured to display the image which is provided from the second source, based on identifying that the first content is not inputted through the first connection interface from the first source, which is in the power-on state, due to a disconnection of a cable between the first source and the display apparatus.

6. The display apparatus as claimed in claim 5, wherein the processor is further configured to display the image which is provided from the second source, based on identifying that the first content is not inputted through the first connection interface from the first source based on an analysis of an object and a color of the image that is inputted through the first connection interface.

7. The display apparatus as claimed in claim 1, the processor is further configured to display the image which is provided from the second source, based on identifying that the first content is not inputted from the first source and determining that the second source reproducing content based on an analysis of an image signal and a sound signal transmitted from the second source.

8. The display apparatus as claimed in claim 1, the processor is further configured to, based on identifying that the first content and the second content are not inputted from the first connection interface and the second connection interface, respectively, change an operating mode of the display to the power-saving state.

9. A method for controlling a display apparatus, the method comprising:

displaying an image corresponding to a first source connected to the display apparatus through a first connection interface of a plurality of connection interfaces;

identifying a change of a power state of a second source connected to the display apparatus through a second connection interface of the plurality of connection interfaces;

identifying, based on the power state of the second source being changed from a power-saving state or a power-off state to a power-on state, whether first content and second content are inputted through the first connection interface and the second connection interface, respectively;

displaying, based on identifying that the first content is inputted from the first source and the second content is not inputted from the second source, the image corresponding to the first source, displaying, based on identifying that the first content is not inputted from the first source and the second content is inputted from the second source, an image corresponding to the second source; and displaying, based on identifying that the first content is inputted from the first source and the second content is inputted from the second source, a user interface (UI) inquiring a user whether to change a source of the display apparatus.

10. The method as claimed in claim 9, wherein the identifying whether the first content and the second content are inputted comprises identifying whether the image corresponding to the first connection interface is a scrambled image.

11. The method as claimed in claim 9, wherein the identifying whether the first content and the second content are inputted comprises, based on the power state of the second source being changed from a power-saving state to a power-on state, identifying whether the first content is inputted through the first connection interface.

12. The method as claimed in claim 9, wherein the identifying whether the first content and the second content are inputted comprises, based on the second source being powered on, identifying whether the first content is inputted through the first connection interface.

13. The method as claimed in claim 9, wherein the displaying the image corresponding to the second source comprises:

displaying the image which is provided from the second source, based on identifying that the first content is not inputted through the first connection interface from the first source, which is in a power-on state, due to a disconnection of a cable between the first source and the display apparatus.

14. The method as claimed in claim 13, wherein the displaying the image corresponding to the second source comprises:

displaying the image which is provided from the second source, based on identifying that the first content is not inputted through the first connection interface from the first source based on an analysis of an object and a color of the image that is inputted through the first connection interface.

15. The method as claimed in claim 9, wherein the identifying whether the first content and the second content are inputted comprises, based on identifying that the first content and the second content are not inputted from the first connection interface and the second connection interface, respectively, changing an operating mode of the display apparatus to the power-saving state.

16. A non-transitory computer readable recording medium storing a program that is executable by a computer to perform the method of claim 9.

* * * * *